(12) United States Patent
Okino et al.

(10) Patent No.: US 12,179,564 B2
(45) Date of Patent: Dec. 31, 2024

(54) SEALING COVER AND SEALING MEMBER (71) Applicant: NISHIKAWA RUBBER CO., LTD., Hiroshima (JP)

(72) Inventors: Fumito Okino, Hiroshima (JP); Keisuke Hamamoto, Hiroshima (JP)

(73) Assignee: NISHIKAWA RUBBER CO., LTD., Hiroshima (JP)

( * ) Notice: Subject to any disclaimer, the term of this patent is extended or adjusted under 35 U.S.C. 154(b) by 358 days.

(21) Appl. No.: 17/861,877

(22) Filed: Jul. 11, 2022

(65) Prior Publication Data

US 2023/0034614 A1 Feb. 2, 2023

(30) Foreign Application Priority Data

Jul. 28, 2021 (JP) ................ 2021-123531

(51) Int. Cl.
*B60J 5/04* (2006.01)
*F16J 15/06* (2006.01)

(52) U.S. Cl.
CPC ............ *B60J 5/0418* (2013.01); *F16J 15/06* (2013.01)

(58) Field of Classification Search
CPC ...... B60J 5/0418; B60J 5/0413; B60J 10/248; B60J 10/246; B60J 10/40; B60J 10/80; B60J 10/86; B60J 10/87; B60J 10/27; B60R 13/0892; B60R 13/06; E06B 7/23; F16J 15/06
USPC ................. 296/146.1, 39.1; 49/498.1, 495.1
See application file for complete search history.

(56) References Cited

U.S. PATENT DOCUMENTS

| | | | |
|---|---|---|---|
| 3,656,260 A | * | 4/1972 | Weaver ............... B60J 10/248 264/45.9 |
| 4,943,109 A | | 7/1990 | Skrbina et al. |
| 5,411,785 A | | 5/1995 | Cook |
| 12,054,038 B2 | | 8/2024 | Okino et al. |

(Continued)

FOREIGN PATENT DOCUMENTS

| | | | | |
|---|---|---|---|---|
| DE | 29922990 U1 | * | 5/2000 | ............ B60J 10/16 |
| DE | 202008004547 U1 | * | 9/2009 | ............ B60J 5/0418 |

(Continued)

OTHER PUBLICATIONS

Blau et al. (DE 29922990 U1), machine translation (Year: 2000).*
Oikawa et al. (JP H02256967 A), machine translation (Year: 1990).*

*Primary Examiner* — Amy R Weisberg
*Assistant Examiner* — Wenwei Zhuo
(74) *Attorney, Agent, or Firm* — Casimir Jones, S.C.; Brian F. Bradley (57) ABSTRACT

A sealing member has a seal body configured to be inserted into a groove of a cover member. The seal body has, in a vehicle-exterior-side end portion, a first sealing lip portion formed in such a manner as to protrude toward a door hole. The first sealing lip portion is configured to be brought into press-contact with a peripheral portion of the groove of the cover member on a side nearer to the door hole. The sealing member includes an edge seal portion provided in the vehicle-exterior-side end portion of the seal body. The edge seal portion is configured to press the first sealing lip portion against the cover member while being brought into press-contact with a peripheral portion of the door hole of a door inner panel.

4 Claims, 9 Drawing Sheets

(56) References Cited

U.S. PATENT DOCUMENTS

| | | | |
|---|---|---|---|
| 2009/0058246 A1* | 3/2009 | Cittadini | F25D 23/087 |
| | | | 49/477.1 |
| 2015/0084288 A1* | 3/2015 | Arata | F16J 15/022 |
| | | | 277/637 |
| 2017/0082145 A1 | 3/2017 | Harada et al. | |
| 2018/0093621 A1 | 4/2018 | Morimoto et al. | |
| 2020/0001691 A1 | 1/2020 | Grella | |
| 2021/0053429 A1 | 2/2021 | Okino et al. | |
| 2021/0266662 A1 | 8/2021 | Honji et al. | |
| 2021/0300161 A1 | 9/2021 | Fortin | |
| 2021/0396317 A1* | 12/2021 | Doman | F16J 15/06 |
| 2022/0153098 A1 | 5/2022 | Fortin et al. | |
| 2022/0219512 A1 | 7/2022 | Okino et al. | |
| 2023/0219401 A1 | 7/2023 | Mira Palacios et al. | |
| 2023/0331075 A1 | 10/2023 | Okino et al. | |

FOREIGN PATENT DOCUMENTS

| | | | | |
|---|---|---|---|---|
| EP | 0397300 A2 * | 11/1990 | | |
| EP | 1388447 A1 * | 2/2004 | | B60J 5/00 |
| EP | 1241037 A1 | 9/2022 | | |
| JP | 62-192959 U | 12/1987 | | |
| JP | 2-256967 | 10/1990 | | |
| JP | H02256967 A * | 10/1990 | | |
| JP | 05-054020 U | 7/1993 | | |
| JP | 2002-502747 | 1/2002 | | |
| JP | 2002-052936 | 2/2002 | | |
| JP | 2002-89713 | 3/2002 | | |
| JP | 2002-295683 | 10/2002 | | |
| JP | 2003-252052 | 9/2003 | | |
| JP | 2004-042861 | 2/2004 | | |
| JP | 2004-050879 | 2/2004 | | |
| JP | 2004-136721 | 5/2004 | | |
| JP | 2005-16651 | 1/2005 | | |
| JP | 2009-166421 | 7/2009 | | |
| JP | 2010-269743 | 12/2010 | | |
| JP | 2015-169241 | 9/2015 | | |
| JP | 2019-117877 | 7/2019 | | |
| JP | 2021-31128 | 3/2021 | | |
| JP | 2021031128 A * | 3/2021 | | |
| JP | 2022108254 A * | 7/2022 | | B60J 10/27 |
| JP | 2022135783 A * | 9/2022 | | |
| JP | 2023015656 A * | 2/2023 | | |
| WO | 2007/147570 | 12/2007 | | |

\* cited by examiner

SEALING COVER AND SEALING MEMBER

This Nonprovisional application claims priority under 35 U.S.C. § 119 on Patent Application No. 2021-123531 filed in Japan on Jul. 28, 2021, the entire contents of which are hereby incorporated by reference.

TECHNICAL FIELD

The present invention relates to sealing covers attached to door inner panels of automobiles, and relates to sealing members for use in sealing structures such as the sealing covers.

BACKGROUND ART

Conventionally, a sealing cover has been used to prevent water such as rainwater from entering the interior of an automobile through a door hole formed in a door inner panel of the automobile. For example, a sealing cover disclosed in Patent Literature 1 has the following configuration.

A door inner panel is provided with a cover member (a carrier plate in Patent Literature 1) that covers a door hole. The cover member has a groove (a channel in Patent Literature 1) that is formed as a recess recessed toward the vehicle interior in such a manner as to surround the door hole. Furthermore, between the door inner panel and the cover member, a sealing member (a foam sealing material in Patent Literature 1) is placed in such a manner as to surround the door hole. The sealing member has a base portion received in the groove of the door inner panel, and a seal portion formed in a vehicle-exterior-side end portion of the base portion. The seal portion of the sealing member is configured to be brought into press-contact with a peripheral portion of the groove of the cover member while being brought into press-contact with a peripheral portion of the door hole of the door inner panel.

CITATION LIST

Patent Literature

[Patent Literature 1]
Japanese Patent Application Publication Tokukai No. 2009-166421

SUMMARY OF INVENTION

Technical Problem

There might be a case in which a portion of the seal portion of the sealing member which is located at an edge portion of the groove of the cover member in a section in which the curvature radius of the groove is small, cannot conform to the shape of the groove of the cover member and might become detached from the cover member. Thus, there have been problems in that the water cutoff property of the seal portion of the sealing member decreases, and this makes it difficult to improve the sealing performance of the sealing cover.

Even in a sealing structure other than the sealing cover, problems similar to those mentioned above might occur when a portion of a sealing member is located at an edge portion of a recess of a cover member in a section in which the curvature radius of the recess is small.

Thus, an object of an aspect of the present invention is to improve sealing performance of a sealing cover and sealing performance of a sealing member.

Solution to Problem

To achieve this object, a sealing cover in accordance with an aspect of the present invention is a sealing cover to be attached to a door inner panel of an automobile, including: a cover member having a groove that is recessed toward a vehicle interior and is formed in such a manner as to surround a door hole of the door inner panel, the cover member being configured to cover the door hole from a vehicle interior side; and a sealing member configured to be placed between the door inner panel and the cover member in such a manner as to surround the door hole, the sealing member including: a seal body inserted into the groove of the cover member, the seal body having, in a vehicle-exterior-side end portion, a first lip portion formed in such a manner as to protrude toward the door hole, the first lip portion being configured to be brought into press-contact with a peripheral portion of the groove of the cover member on a side nearer to the door hole (inner peripheral portion); and a seal portion provided in the vehicle-exterior-side end portion of the seal body, the seal portion being configured to press the first lip portion against the cover member while being brought into press-contact with a peripheral portion of the door hole of the door inner panel.

To achieve the abovementioned object, a sealing member in accordance with an aspect of the present invention is a sealing member to be placed between a cover member and a mounting base to which the cover member is attached, in such a manner as to surround an opening of the mounting base, the sealing member including: a seal body configured to be inserted into a recess formed in the cover member in such a manner as to surround the opening of the mounting base, the seal body having, in one side end portion, a first lip portion formed in such a manner as to protrude to a seal-inner side, the first lip portion being configured to be brought into press-contact with a peripheral portion of the recess of the cover member on a side nearer to the opening; and a seal portion provided in the one side end portion of the seal body, the seal portion being configured to press the first lip portion against the cover member while being brought into press-contact with a peripheral portion of the opening of the mounting base.

Advantageous Effects of Invention

According to an aspect of the present invention, the water cutoff property of the first lip portion increases, resulting in an improvement in sealing performance of the sealing cover. Furthermore, the sealing property of the first lip portion increases, resulting in an improvement in sealing performance of the sealing member.

DESCRIPTION OF EMBODIMENTS

The following will describe embodiments of the present invention with reference to the drawings. As used in the present specification and the accompanying claims, the term "press-contact" refers to a state of being in contact by pressure. The term "mounting base" refers to a member to which a cover member is attached, and includes a door inner panel. The term "opening" of the mounting base includes a door hole formed in the door inner panel. The term "recess" of the cover member includes a groove of the cover member and a step portion of the cover member. The term "seal-outer side" refers to a side farther from the opening of the mounting base, or a side away from the door hole, in a state in which a sealing member is placed between the cover member and the mounting base in such a manner as to surround the opening of the mounting base. The term "seal-inner side" refers to a side closer to the center of the opening of the mounting base, or a side nearer toward the center of the door hole, in a state in which the sealing member is placed between the mounting base and the cover member in such a manner as to surround the opening of the mounting base. In the drawings, "CE" indicates the vehicle exterior side, "CI" indicates a vehicle interior side, "SE" indicates the seal-outer side (the side away from the door hole), "SI" indicates the seal-inner side (the side nearer to the door hole), "U" indicates the up, and "D" indicates the down.

Embodiment 1

Figure 1:
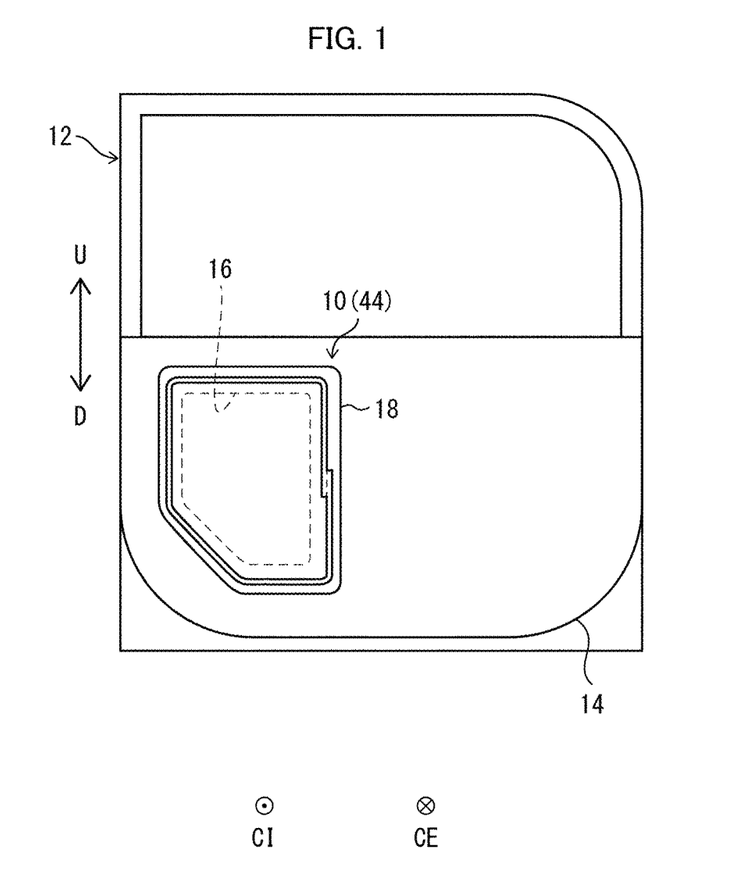
FIG. 1 is a schematic view illustrating a vehicle-interior-side structure of a door for an automobile, in which a sealing cover in accordance with Embodiment 1 or 2 is attached to a door inner panel.
Figure 2:
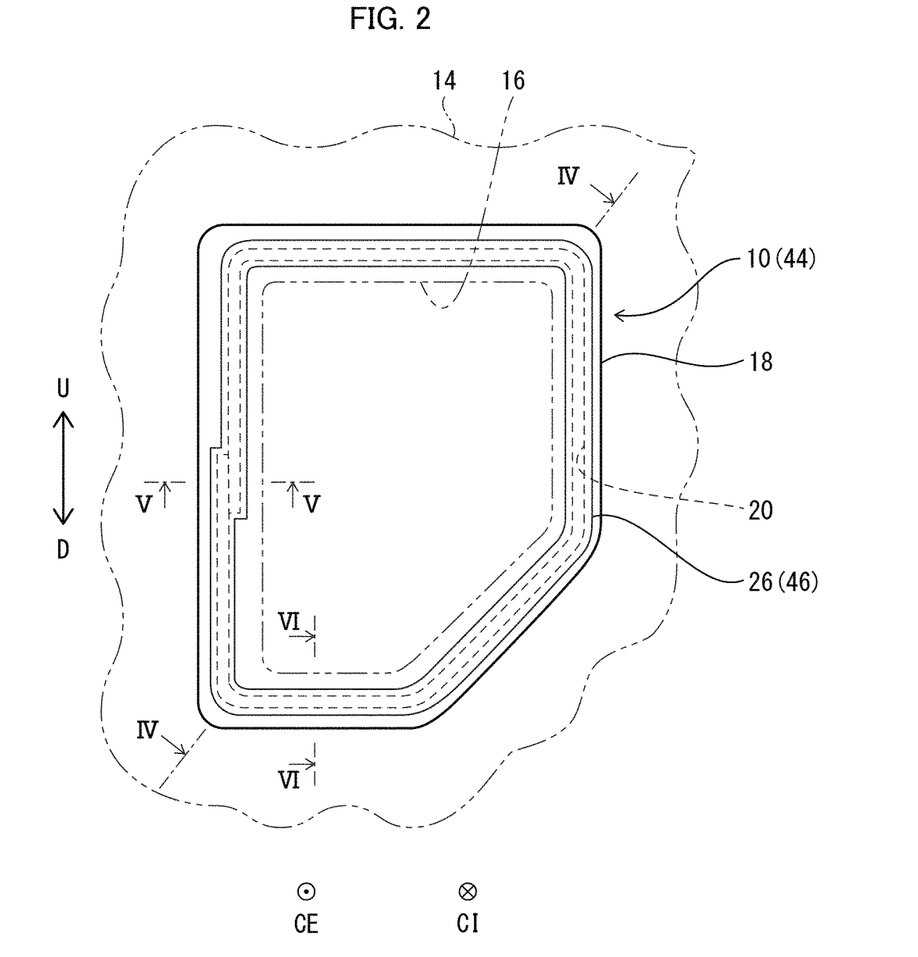
FIG. 2 is a schematic view of the sealing cover in accordance with Embodiment 1 or 2, as viewed from a vehicle exterior side.
Figure 3:
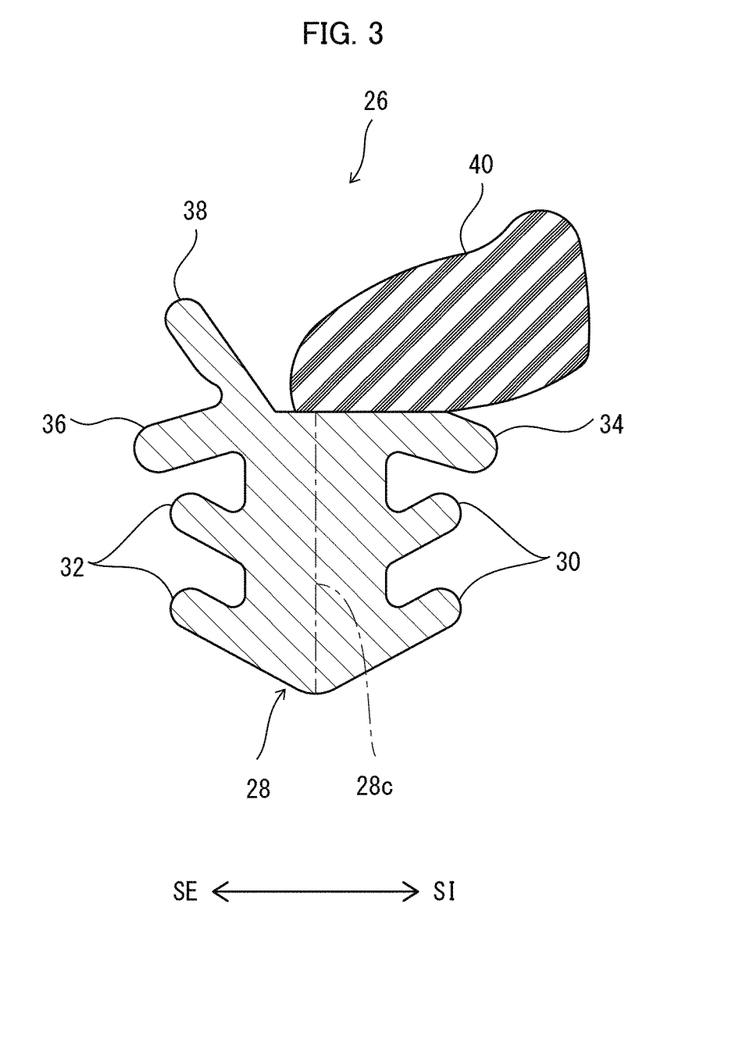
FIG. 3 is a cross-sectional view of a sealing member in accordance with Embodiment 1.
Figure 4:
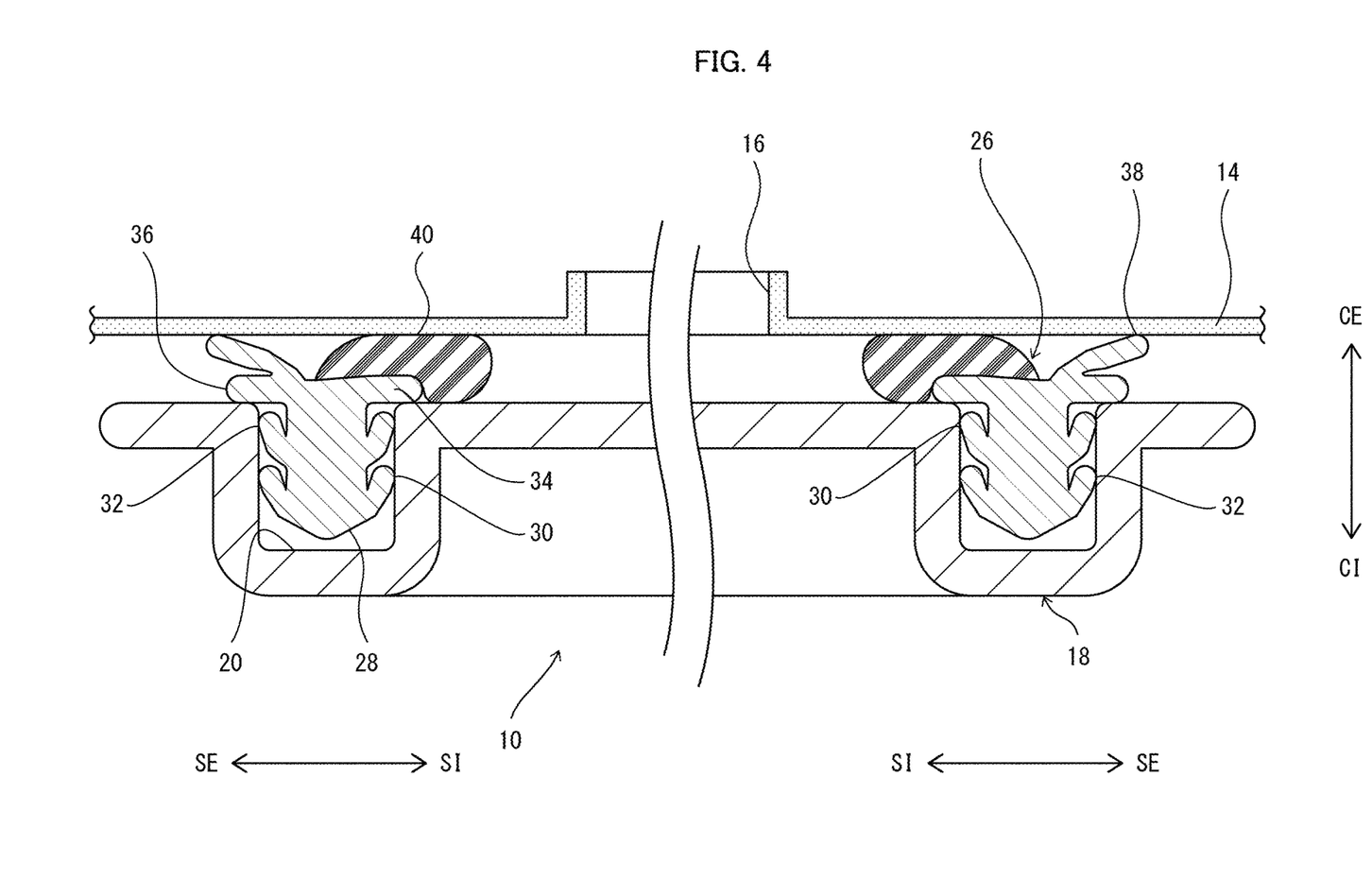
FIG. 4 is a cross-sectional view illustrating a part of a sealing cover in accordance with Embodiment 1, taken along line IV-IV in FIG. 2.
Figure 5:
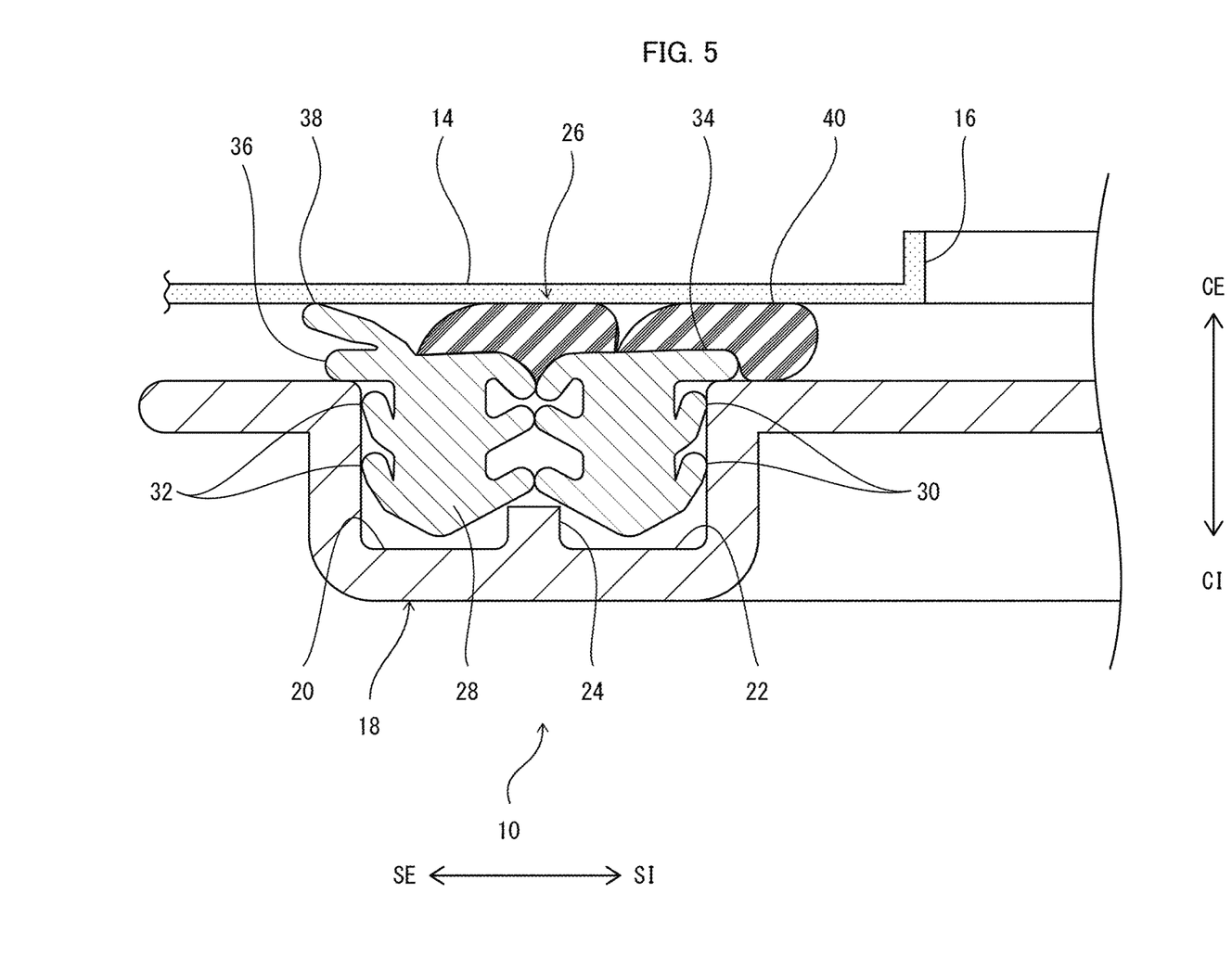
FIG. 5 is a cross-sectional view illustrating a part of the sealing cover in accordance with Embodiment 1, taken along line V-V in FIG. 2.
Figure 6:
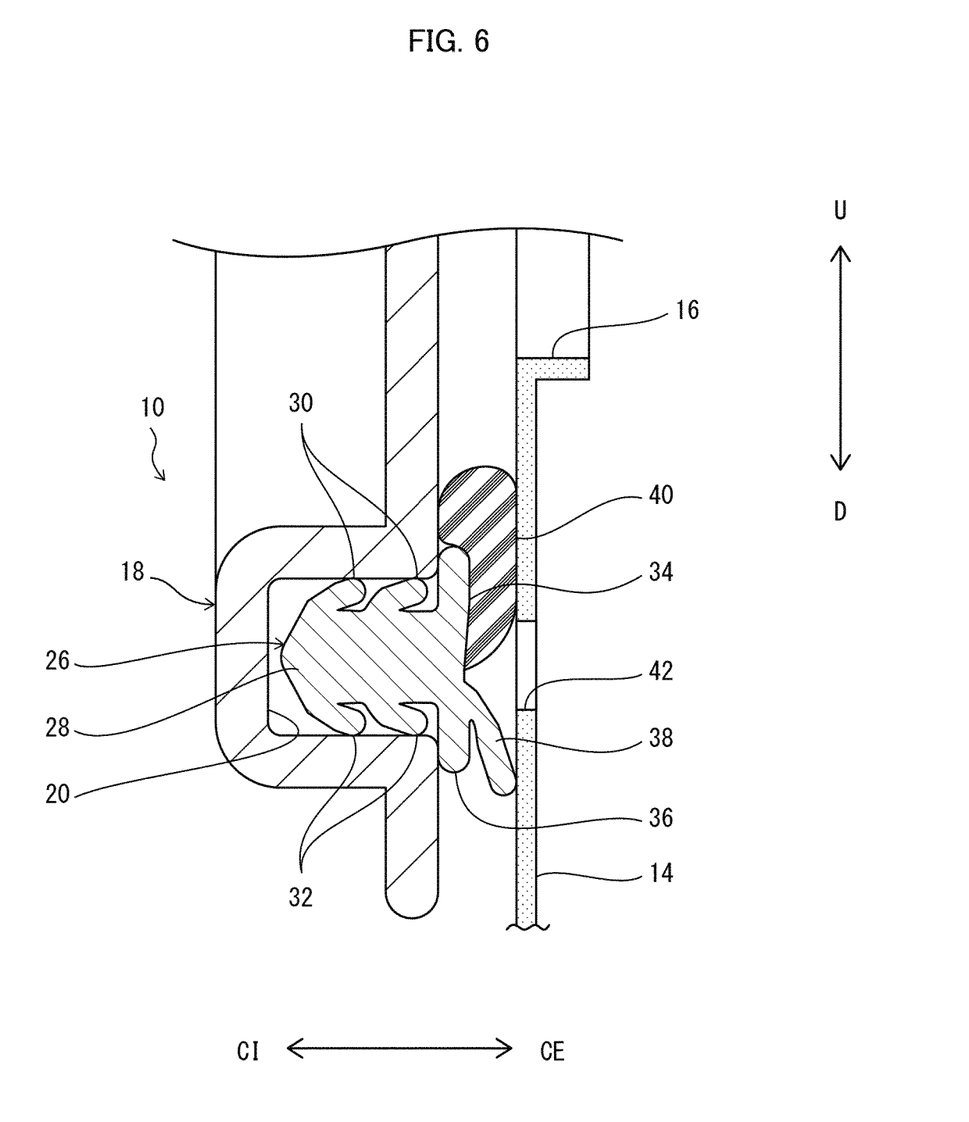
FIG. 6 is a cross-sectional view illustrating a part of the sealing cover in accordance with Embodiment 1, taken along line VI-VI in FIG. 2.

The following will describe Embodiment 1 with reference to FIGS. 1 to 6. FIG. 1 is a schematic view illustrating a vehicle-interior-side structure of a door for an automobile, in which a sealing cover in accordance with Embodiment 1 is attached to a door inner panel. FIG. 2 is a schematic view of the sealing cover in accordance with Embodiment 1, as viewed from the vehicle exterior side. FIG. 3 is a cross-sectional view of a sealing member in accordance with Embodiment 1. FIG. 4 is a cross-sectional view illustrating a part of the sealing cover in accordance with Embodiment 1, taken along line IV-IV in FIG. 2. FIG. 5 is a cross-sectional view illustrating a part of the sealing cover in accordance with Embodiment 1, taken along line V-V in FIG. 2. FIG. 6 is a cross-sectional view illustrating a part of the sealing cover in accordance with Embodiment 1, taken along line VI-VI in FIG. 2.

(Outline of Sealing Cover 10)

As illustrated in FIGS. 1 and 2, a sealing cover 10 in accordance with Embodiment 1 is a sealing structure that is attached to a door inner panel 14, which constitutes a part of a door 12 for an automobile, to prevent water such as rainwater from entering a vehicle interior through a door hole 16 formed in the door inner panel 14. Here, the door hole 16 is an opening through which an operator can insert a hand, a tool, and the like, to, for example, repair various parts disposed inside the door 12. It should be noted that FIG. 1 illustrates a front door as an example of the door 12.

(Cover Member 18)

As illustrated in FIG. 2, the sealing cover 10 includes a cover member 18 provided on the door inner panel 14 by means of a clip (not illustrated) and covering the door hole 16 from the vehicle interior side. The cover member 18 has a groove 20 that serves as a recess recessed toward the vehicle interior and that is formed in such a manner as to surround the door hole 16. The groove 20 has one end portion and the other end portion that are connected in parallel; in other words, the groove 20 has a connecting portion 22 that connects the end portions in parallel. At the center of the connecting portion 22 of the groove 20, an intermediate wall 24 (see FIG. 5) is formed.

The cover member 18 is made of, for example, a vulcanized rubber, a thermoplastic elastomer, a thermoplastic resin, or a metal. Examples of the vulcanized rubber may include ethylene-propylene-diene rubber (EPDM), isoprene rubber (IR), chloroprene rubber (CR), styrene-butadiene rubber (SBR), and acrylonitrile-butadiene rubber (NBR). Examples of the thermoplastic elastomer may include a thermoplastic olefinic elastomer (TPO) and a thermoplastic styrenic elastomer (TPS). Examples of the thermoplastic resin may include polyethylene (PE), polypropylene (PP), polyvinyl alcohol (PVA), polyvinylchloride (PVC), polystyrene (PS), acrylonitrile-butadiene-styrene (ABS), and ethylene-vinyl acetate (EVA). Examples of a composite may include a fiber aggregate such as a glass fiber blend. Examples of the metal may include aluminum and iron.

(Sealing Member 26)

As illustrated in FIG. 2, the sealing cover 10 includes a string-shaped sealing member 26 that is placed between the door inner panel 14 and the cover member 18 in such a manner as to surround the door hole 16. Specific structure of the sealing member 26 in accordance with Embodiment 1 is as follows.

(Seal Body 28)

As illustrated in FIGS. 3 to 5, the sealing member 26 has a seal body 28 inserted into (received in) the groove 20 of the cover member 18. The seal body 28 is configured to be in the form of a solid. The seal body 28 is made of, for example, a vulcanized rubber, a thermoplastic elastomer, or a thermoplastic resin. Examples of the vulcanized rubber may include EPDM, isoprene rubber (IR), chloroprene rubber (CR), styrene-butadiene rubber (SBR), and acrylonitrile-butadiene rubber (NBR). Examples of the thermoplastic elastomer may include a thermoplastic olefinic elastomer (TPO) and a thermoplastic styrenic elastomer (TPS). Examples of the thermoplastic resin may include polyethylene (PE), polypropylene (PP), ethylene-vinyl acetate copolymer (EVA), and polyvinyl chloride.

The seal body 28 has a first holding lip portion 30 formed in a seal-inner-side portion thereof. The first holding lip portion 30 is configured to be, by its elastic force, brought into press-contact with an inner wall of the groove 20 of the cover member 18 on a side nearer to the door hole 16 (i.e., inner-side inner wall). The seal body 28 has a second holding lip portion 32 formed in a seal-outer-side portion thereof. The second holding lip portion 32 is configured to be, by its elastic force, brought into press-contact with an inner wall of the groove 20 of the cover member 18 on a side farther from the door hole 16 (i.e., outer-side inner wall). This makes the seal body 28 stably held in the groove 20 of the cover member 18.

The seal body 28 has a first sealing lip portion 34, which serves as a first lip portion, formed in a vehicle-exterior-side end portion, which is one side end portion of the seal body 28, in such a manner as to protrude toward the door hole 16 (to the seal-inner side). The first sealing lip portion 34 is configured to be, by its elastic force, brought into press-contact with a peripheral portion of the groove 20 of the cover member 18 on a side nearer to the door hole 16 (i.e., inner peripheral portion). Furthermore, the seal body 28 has a second sealing lip portion 36, which serves as a second lip portion, formed in the vehicle-exterior-side end portion in such a manner as to protrude away from the door hole 16 (to the seal-outer side). The second sealing lip portion 36 is configured to be, by its elastic force, brought into press-contact with a peripheral portion of the groove 20 of the cover member 18 on a side farther from the door hole 16 (i.e., outer peripheral portion). In a base end portion of the second sealing lip portion 36, a third sealing lip portion 38, which serves as a third lip portion, is formed in such a manner as to protrude away from the door hole 16. The third sealing lip portion 38 is configured to be, by its elastic force, brought into press-contact with a peripheral portion of the door hole 16 of the door inner panel 14.

(Edge Seal Portion 40)

As illustrated in FIGS. 3 to 5, in the vehicle-exterior-side end portion of the seal body 28, an edge seal portion 40, which serves as a seal portion, is provided in such a manner as to protrude toward the exterior of the vehicle. The edge seal portion 40 is configured to be in the form of an expanded sponge. Alternatively, the edge seal portion 40 may be configured such that a part of the edge seal portion 40 is in the form of a sponge, while the remaining part of the edge seal portion 40 is in the form of a solid. The edge seal portion 40 is made of, for example, a vulcanized rubber, a thermoplastic elastomer, or a thermoplastic resin, similarly to the seal body 28. The edge seal portion 40 may be formed simultaneously with the seal body 28 by co-extrusion molding.

The edge seal portion 40 is configured to be, by its elastic force, brought into press-contact with a peripheral portion of the door hole 16 of the door inner panel 14. Furthermore, the edge seal portion 40 is configured to press the first sealing lip portion 34 against the inner peripheral portion of the groove 20 of the cover member 18 in a state in which the edge seal portion 40 covers the first sealing lip portion 34, while being brought into press-contact with the peripheral portion of the door hole 16 of the door inner panel 14.

The edge seal portion 40, even in a state before the edge seal portion 40 is not brought into press-contact with the peripheral portion of the door hole 16 of the door inner panel 14, inclines toward the first sealing lip portion 34 (to the seal-inner side) with respect to a center line 28c of the seal body 28. This reduces a load applied by the sealing member 26 to the door inner panel 14 at the time when the cover member 18 is mounted on the door inner panel 14, resulting in an improvement in mountability of the cover member 18. It should be noted that the center line 28c of the seal body 28 is intended to refer to the center line of the rest of the seal body 28, excluding the first sealing lip portion 34, the second sealing lip portion 36, and the third sealing lip portion 38.

Since the edge seal portion 40 is configured to be in the form of a sponge as described above, the edge seal portion 40 is softer than the seal body 28. This causes compressive deformation of the edge seal portion 40 so that the edge seal portion 40 is brought into tight contact with the peripheral portion of the door hole 16 of the door inner panel 14, the first sealing lip portion 34, and the inner peripheral portion of the groove of the cover member 18. Herein, "soft" is intended to include an aspect in which the edge seal portion 40 is formed in a shape, such as a hollow shape, that allows the edge seal portion 40 to easily change its form, in addition to an aspect in which the edge seal portion 40 is made of a soft material.

(Another Feature of the Sealing Member 26)

A section of the third sealing lip portion 38 located below the door hole 16 is brought into press-contact with the door inner panel 14 at a portion located below a drain hole 42 formed right below the peripheral portion of the door hole 16 of the door inner panel 14. A section of the edge seal portion 40 located below the door hole 16 is brought into press-contact with the door inner panel 14 at a portion located above the drain hole 42. Thus, even when water such as rainwater has entered a space between the edge seal portion 40 and the third sealing lip portion 38 through the door hole 16, it is possible to drain such water to the exterior (outside) of the vehicle through the drain hole 42 by gravity.

(Effects)

Next, the following will describe effects achieved by Embodiment 1.

The first sealing lip portion 34 is brought into press-contact with the inner peripheral portion of the groove 20 of the cover member 18, and simultaneously, the second sealing lip portion 36 is brought into press-contact with the outer peripheral portion of the groove 20 of the cover member 18. This enables the first sealing lip portion 34 and the second sealing lip portion 36 to cut off, in a duplicated manner on a cover member 18 side, water such as rainwater that has entered a gap between the door inner panel 14 and the cover member 18 through the door hole 16. Furthermore, the edge seal portion 40 and the third sealing lip portion 38 are brought into press-contact with the peripheral portion of the door hole 16 of the door inner panel 14. This enables the edge seal portion 40 and the third sealing lip portion 38 to cut off, in a duplicated manner on a door inner panel 14 side, water such as rainwater that has entered the gap between the door inner panel 14 and the cover member 18 through the door hole 16. Thus, it is possible to prevent water from entering the vehicle interior through the door hole 16.

As described above, the edge seal portion 40 is configured to press the first sealing lip portion 34 against the cover member 18 in a state in which the edge seal portion 40 covers the first sealing lip portion 34, while being brought into press-contact with the peripheral portion of the door hole 16 of the door inner panel 14. Thus, although a portion of the first sealing lip portion 34 which is located at an edge portion of the groove 20 of the cover member 18 in a section in which the curvature radius of the groove 20 is small, tends to become detached from the cover member 18, it is possible to prevent the first sealing lip portion 34 from locally becoming detached from the cover member 18.

Thus, according to Embodiment 1, the water cutoff property of the first sealing lip portion 34 and that of the edge seal portion 40 increase, resulting in an improvement in sealing performance of the sealing cover 10 (sealing performance of the sealing member 26).

Embodiment 2

Figure 7:
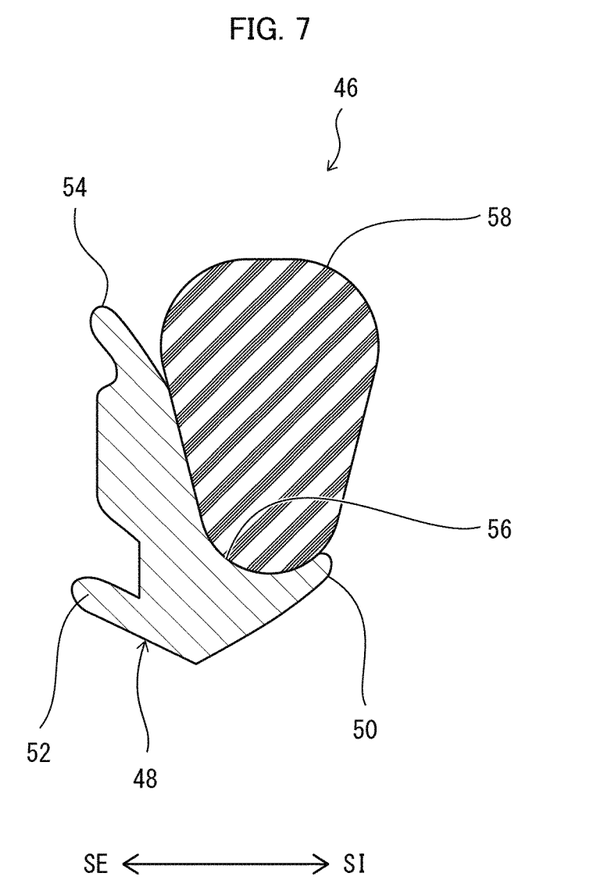
FIG. 7 is a cross-sectional view of a sealing member in accordance with Embodiment 2.
Figure 8:
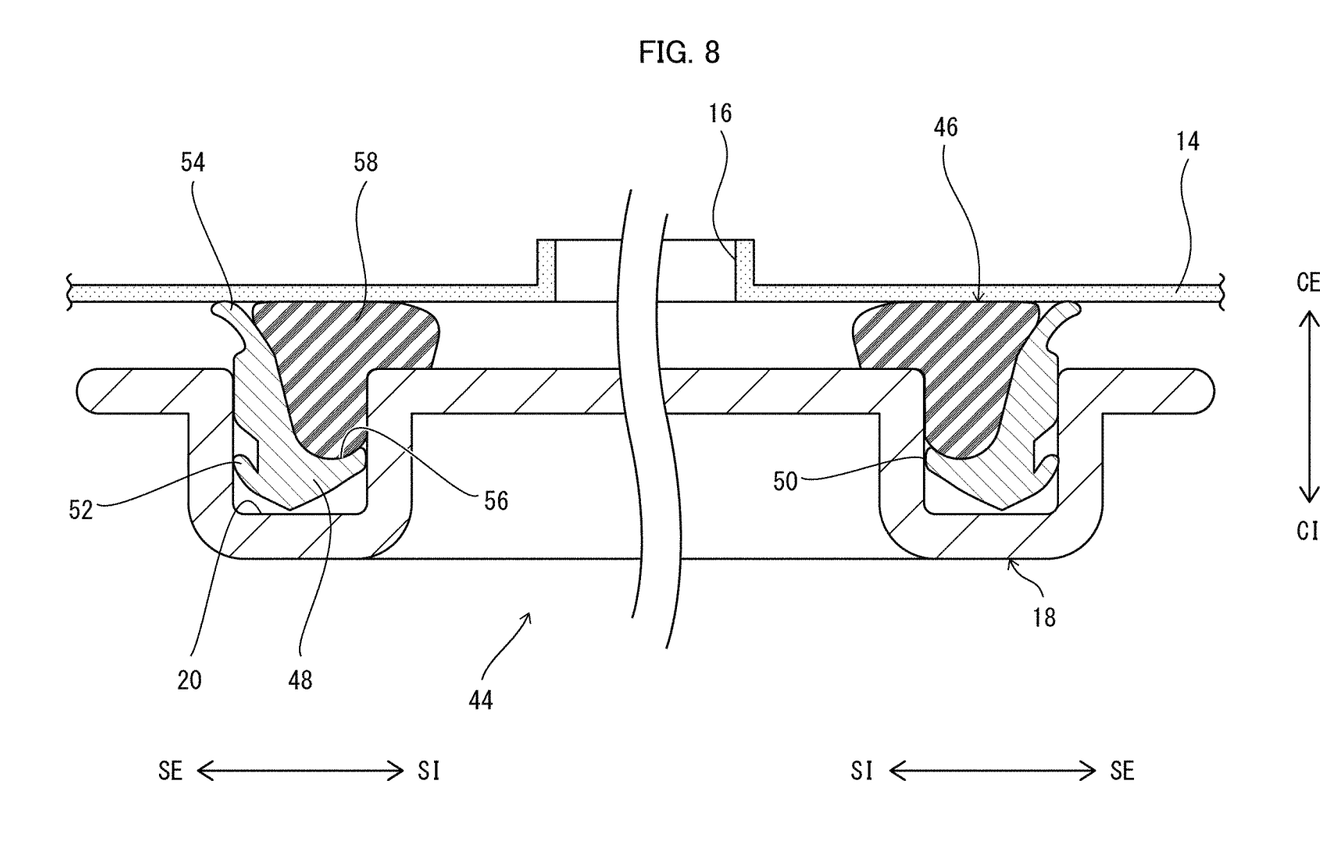
FIG. 8 is a cross-sectional view illustrating a part of a sealing cover in accordance with Embodiment 2, taken along line IV-IV in FIG. 2.
Figure 9:
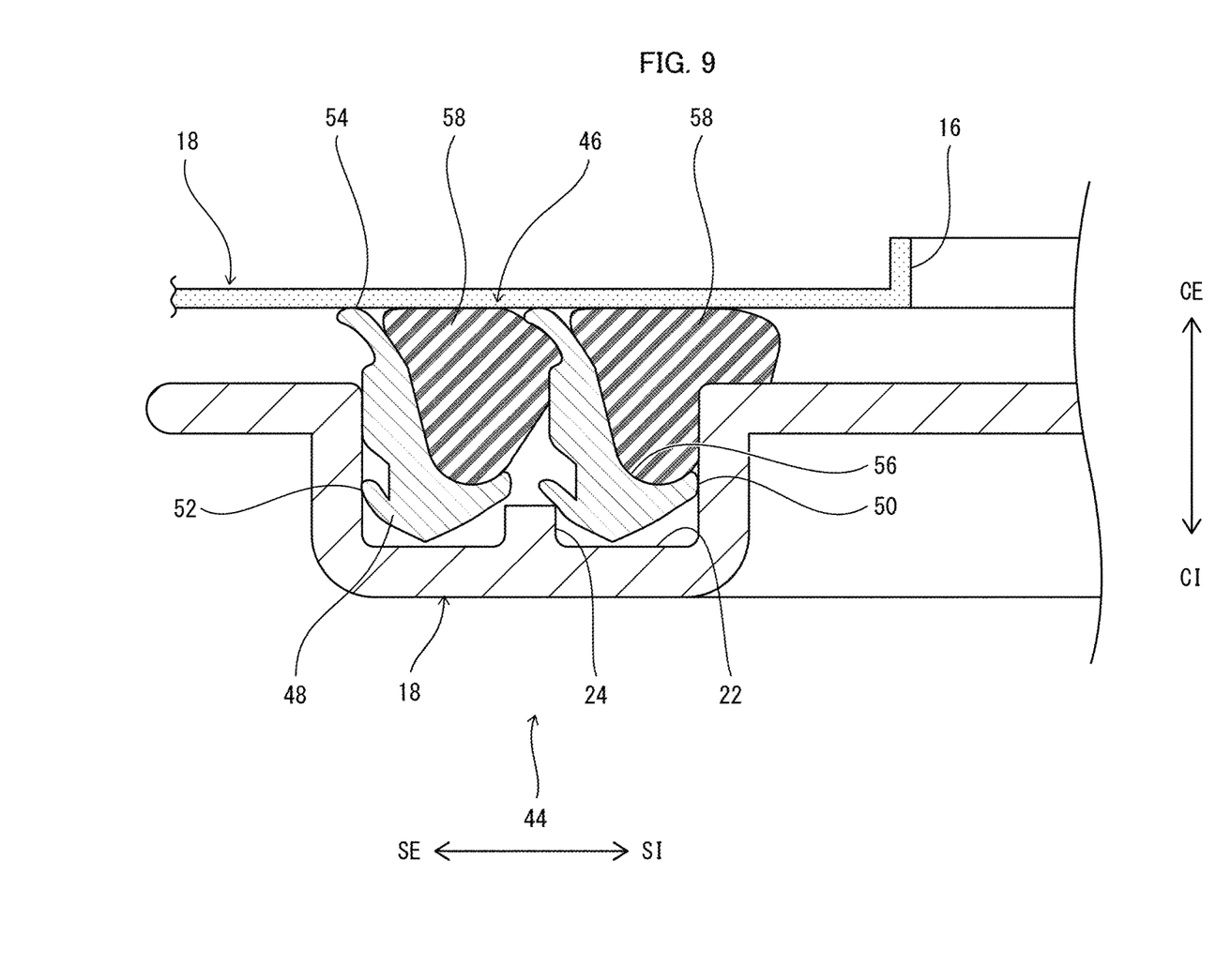
FIG. 9 is a cross-sectional view illustrating a part of the sealing cover in accordance with Embodiment 2, taken along line V-V in FIG. 2.

Embodiment 2 will be described with reference to FIGS. 1, 2, and 7 to 9. FIG. 1 is a schematic view illustrating a vehicle-interior-side structure of a door for an automobile, in which a sealing cover in accordance with Embodiment 2 is attached to a door inner panel. FIG. 2 is a schematic view of the sealing cover in accordance with Embodiment 2, as viewed from the vehicle exterior side. FIG. 7 is a cross-sectional view of a sealing member in accordance with Embodiment 2. FIG. 8 is a cross-sectional view illustrating a part of the sealing cover in accordance with Embodiment 2, taken along line IV-IV in FIG. 2. FIG. 9 is a cross-sectional view illustrating a part of the sealing cover in accordance with Embodiment 2, taken along line V-V in FIG. 2.

(Outline of Sealing Cover 44)

As illustrated in FIGS. 1 and 2, a sealing cover 44 in accordance with Embodiment 2 is a sealing structure that is attached to a door inner panel 14, to prevent water such as rainwater from entering a vehicle interior through a door hole 16 formed in the door inner panel 14. Only differences in configuration of the sealing cover 44 from the sealing cover 10 in accordance with Embodiment 1 (see FIG. 2) will be described below. For convenience of description, components having the same functions as those of the components described in Embodiment 1 are denoted by the same reference signs.

(Sealing Member 46)

As illustrated in FIG. 2, the sealing cover 44 includes a string-shaped sealing member 46 that is placed between the door inner panel 14 and a cover member 18 in such a manner as to surround the door hole 16. Specific structure of the sealing member 46 in accordance with Embodiment 2 is as follows.

(Seal Body 48)

As illustrated in FIGS. 7 to 9, the sealing member 46 has a seal body 48 inserted into (received in) a groove 20 of the cover member 18. The seal body 48 is made of a solid rubber. Examples of a vulcanized rubber constituting the solid rubber may include EPDM, isoprene rubber (IR), chloroprene rubber (CR), styrene-butadiene rubber (SBR), and acrylonitrile-butadiene rubber (NBR).

The seal body 48 has a first holding lip portion 50 formed in a portion on a seal-inner side (in a portion nearer to the door hole 16). The first holding lip portion 50 is configured to be, by its elastic force, brought into press-contact with an inner-side inner wall of the groove 20 of the cover member 18. The seal body 48 has a second holding lip portion 52 formed in a seal-outer-side portion thereof. The second holding lip portion 52 is configured to be, by its elastic force, brought into press-contact with an outer-side inner wall of the groove 20 of the cover member 18. This makes the seal body 48 stably held in the groove 20 of the cover member 18.

The seal body 48 has a sealing lip portion 54, which serves as a lip portion, formed in a vehicle-exterior-side end portion thereof in such a manner as to protrude away from the door hole 16 (to a seal-outer side). The sealing lip portion 54 is configured to be, by its elastic force, brought into press-contact with a peripheral portion of the door hole 16 of the door inner panel 14. Furthermore, the seal body 48 has a depression 56 formed in a portion extending from a vehicle-exterior-side end portion, which is one side end portion of the seal body 48, toward the door hole 16.

(Edge Seal Portion 58)

In the depression 56 of the seal body 48, an edge seal portion 58 is provided as a seal portion, and a part of the edge seal portion 58 is received in (inserted into) the groove 20 of the cover member 18. The edge seal portion 58 is made of a sponge rubber. Examples of a vulcanized rubber constituting the sponge rubber may include EPDM, isoprene rubber (IR), chloroprene rubber (CR), styrene-butadiene rubber (SBR), or acrylonitrile-butadiene rubber (NBR). The edge seal portion 58 may be formed simultaneously with the seal body 48 by co-extrusion molding.

The edge seal portion 58 is configured to be, by its elastic force, brought into press-contact with a peripheral portion of the door hole 16 of the door inner panel 14. Furthermore, the edge seal portion 58 is configured to be, by its elastic force, brought into press-contact with a door-hole-side peripheral portion (inner peripheral portion) of the groove 20 of the cover member 18 while being brought into press-contact with the peripheral portion of the door hole 16 of the door inner panel 14.

(Effects)

Next, the following will describe effects achieved by Embodiment 2.

The edge seal portion 58 is brought into press-contact with the inner peripheral portion of the groove 20 of the cover member 18 while being brought into press-contact with the peripheral portion of the door hole 16 of the door inner panel 14, and simultaneously the sealing lip portion 54 is brought into press-contact with the peripheral portion of the door hole 16 of the door inner panel 14. This enables the edge seal portion 58 to cut off, on a door inner panel 14 side and on a cover member 18 side, water that has entered a gap between the door inner panel 14 and the cover member 18 through the door hole 16. This also enables the edge seal portion 58 and the sealing lip portion 54 to cut off, in a duplicated manner on a door inner panel 14 side, water such as rainwater that has entered the gap between the door inner panel 14 and the cover member 18 through the door hole 16. Thus, it is possible to prevent water such as rainwater from entering the vehicle interior through the door hole 16.

Furthermore, as described above, the seal body 48 has the depression 56 formed in the portion extending toward the door hole 16, and the edge seal portion 58 made of a sponge rubber is provided in the depression 56 of the seal body 48. A part of the edge seal portion 58 is received in the groove 20 of the cover member 18. The edge seal portion 58 is configured to be brought into press-contact with the inner peripheral portion of the groove 20 of the cover member 18 while being brought into press-contact with the peripheral portion of the door hole 16 of the door inner panel 14. Thus, even when a portion of the edge seal portion 58 is located at an edge portion of the groove 20 of the cover member 18 in a section in which the curvature radius of the groove 20 is small, detachment of the portion of the edge seal portion 58 from the cover member 18 does not occur. In the connecting portion 22 of the groove 20 of the cover member 18, one end portion and the other end portion of the sealing member 46 are brought into sufficiently tight contact with each other.

Therefore, according to Embodiment 2, the water cutoff property of the edge seal portion 58 increases, resulting in an improvement in sealing performance of the sealing cover 44 (sealing performance of the sealing member 46).

Alternative Embodiments

The configuration of the sealing member 26 (46) may be applied to another sealing structure instead of the sealing cover 10 (44). This enables such another sealing structure to prevent entry of fluid through an opening of a mounting base and to prevent entry of fluid into an opening of a mounting base.

[Summary]

A sealing cover in accordance with an aspect of the present invention is a sealing cover to be attached to a door inner panel of an automobile, including: a cover member having a groove that is recessed toward a vehicle interior and is formed in such a manner as to surround a door hole of the door inner panel, the cover member being configured to cover the door hole from a vehicle interior side; and a sealing member configured to be placed between the door inner panel and the cover member in such a manner as to surround the door hole, the sealing member including: a seal body inserted into the groove of the cover member, the seal body having, in a vehicle-exterior-side end portion, a first lip portion formed in such a manner as to protrude toward the door hole, the first lip portion being configured to be brought into press-contact with a peripheral portion of the groove of the cover member on a side nearer to the door hole (inner peripheral portion); and a seal portion provided in the vehicle-exterior-side end portion of the seal body, the seal portion being configured to press the first lip portion against the cover member while being brought into press-contact with a peripheral portion of the door hole of the door inner panel.

With the above configuration, the first lip portion is brought into press-contact with the peripheral portion of the groove of the cover member on the side nearer to the door hole, so that the first lip portion cuts off, on a cover member side, water that has entered a gap between the door inner panel and the cover member through the door hole. The seal portion is brought into press-contact with the peripheral portion of the door hole of the door inner panel, so that the seal portion cuts off, on a door inner panel side, water that has entered a gap between the door inner panel and the cover member through the door hole. Thus, it is possible to prevent water from entering the vehicle interior through the door hole.

As described above, the seal portion is configured to press the first lip portion against the cover member while being brought into press-contact with the peripheral portion of the door hole of the door inner panel. Thus, although a portion of the first lip portion which is located at an edge portion of the groove of the cover member in a section in which the curvature radius of the groove is small, tends to become detached from the cover member, it is possible to prevent the first lip portion from locally becoming detached from the cover member. This increases the water cutoff property of the first lip portion, resulting in an improvement in sealing performance of the sealing cover.

In the sealing cover in accordance with an aspect of the present invention, the seal portion may be configured to press the first lip portion against the cover member in a state in which the seal portion covers the first lip portion, while being brought into press-contact with the peripheral portion of the door hole of the door inner panel.

According to the above configuration, the seal portion is brought into press-contact with the peripheral portion of the groove of the cover member on the side nearer to the door hole while being brought into press-contact with the peripheral portion of the door hole of the door inner panel. This enables the seal portion to cut off, on a door inner panel side and a cover member side, water that has entered a gap between the door inner panel and the cover member through the door hole. This increases not only the water cutoff property of the first lip portion but also the water cutoff property of the seal portion, resulting in an improvement in sealing performance of the sealing cover.

The sealing cover in accordance with an aspect of the present invention may include the seal body having, in the vehicle-exterior-side end portion: a second lip portion formed in such a manner as to protrude away from the door hole, the second lip portion being configured to be brought into press-contact with a peripheral portion of the groove of the cover member on a side farther from the door hole (outer peripheral portion); and a third lip portion formed in a base end portion of the second lip portion in such a manner as to protrude away from the door hole, the third lip portion being configured to be brought into press-contact with a peripheral portion of the door hole of the door inner panel.

In this configuration, the second lip portion is brought into press-contact with the peripheral portion of the groove of the cover member on the side farther from the door hole. This enables the first lip portion and the second lip portion to cut off, in a duplicated manner on a cover member side, water that has entered a gap between the door inner panel and the cover member through the door hole. Further, the third lip portion is brought into press-contact with the peripheral portion of the door hole of the door inner panel. This enables the seal portion and the third lip portion to cut off, in a duplicated manner on a door inner panel side, water that has entered a gap between the door inner panel and the cover member through the door hole. Thus, it is possible to sufficiently prevent water from entering the vehicle interior through the door hole.

A sealing member in accordance with an aspect of the present invention is a sealing member to be placed between a cover member and a mounting base to which the cover member is attached, in such a manner as to surround an opening of the mounting base, the sealing member including: a seal body configured to be inserted into a recess formed in the cover member in such a manner as to surround the opening of the mounting base, the seal body having, in one side end portion, a first lip portion formed in such a manner as to protrude to a seal-inner side, the first lip portion being configured to be brought into press-contact with a peripheral portion of the recess of the cover member on a side nearer to the opening; and a seal portion provided in the one side end portion of the seal body, the seal portion being configured to press the first lip portion against the cover member while being brought into press-contact with a peripheral portion of the opening of the mounting base.

According to the above configuration, the first lip portion is brought into press-contact with the peripheral portion of the recess of the cover member on the side nearer to the opening, so that the first lip portion seals against the entry of fluid on a cover member side. The seal portion is brought into press-contact with the peripheral portion of the opening of the mounting base, so that the seal portion seals against the entry of fluid on a mounting base side. This makes it possible to prevent entry of fluid through the opening of the mounting base and to prevent entry of fluid into the opening of the mounting base.

As described above, the seal portion is configured to press the first lip portion against the cover member while being brought into press-contact with the peripheral portion of the opening of the mounting base. Thus, although a portion of the first lip portion which is located at an edge portion of the groove of the cover member in a section in which the curvature radius of the groove is small, tends to become detached from the cover member, it is possible to prevent the first lip portion from locally becoming detached from the cover member. This increases the sealing property of the first lip portion, resulting in an improvement in sealing performance of the sealing member.

In the sealing member in accordance with an aspect of the present invention, the seal portion may be configured to press the first lip portion against the cover member in a state in which the seal portion covers the first lip portion, while being brought into press-contact with peripheral portion of the opening of the mounting base.

According to the above configuration, the seal portion is brought into press-contact with the peripheral portion of the recess of the cover member on the side nearer to the opening while being brought into press-contact with the peripheral portion of the opening of the mounting base. Thus, the seal portion seals against the entry of fluid on a mounting base side and on a cover member side. This increases the sealing property of the seal portion, resulting in an improvement in sealing performance of the sealing member.

The sealing member in accordance with an aspect of the present invention may include the seal body having, in the one side end portion: a second lip portion formed in such a manner as to protrude to a seal-outer side, the second lip portion being configured to be brought into press-contact with a peripheral portion of the recess of the cover member on a side farther from the opening; and a third lip portion formed in a base end portion of the second lip portion in such a manner as to protrude to the seal-outer side, the third lip portion being configured to be brought into press-contact with a peripheral portion of the opening of the mounting base.

According to the above configuration, the second lip portion is brought into press-contact with the peripheral portion of the recess of the cover member on the side farther from the opening. Thus, the first lip portion and the second lip portion seal against the entry of fluid in a duplicated manner on a cover member side. Further, the third lip portion is brought into press-contact with the peripheral portion of the opening of the mounting base. Thus, the seal portion and the third lip portion seal against the entry of fluid in a duplicated manner on a mounting base side. This makes it possible to sufficiently prevent entry of fluid through the opening of the mounting base and to prevent entry of fluid into the opening of the mounting base.

Furthermore, to achieve the abovementioned object, a sealing cover in accordance with an aspect of the present invention is a sealing cover to be attached to a door inner panel of an automobile, including: a cover member having a groove that is recessed toward a vehicle interior and is formed in such a manner as to surround a door hole, the cover member being configured to cover the door hole from a vehicle-interior side; and a sealing member configured to be placed between the door inner panel and the cover member in such a manner as to surround the door hole, the sealing member including: a seal body inserted into the groove of the cover member, the seal body being made of a solid rubber, the seal body having a depression formed in a portion extending toward the door hole; and a seal portion provided in the depression of the seal body, the seal portion being made of a sponge rubber, the seal portion being configured to be brought into press-contact with a peripheral portion of the groove of the cover member on a side nearer to the door hole (inner peripheral portion) while being brought into press-contact with a peripheral portion of the door hole of the door inner panel.

According to the above configuration, the seal portion is brought into press-contact with the peripheral portion of the groove of the cover member on the side nearer to the door hole while being brought into press-contact with the peripheral portion of the door hole of the door inner panel. This enables the seal portion to cut off, on a door inner panel side and a cover member side, water that has entered a gap between the door inner panel and the cover member through the door hole. Thus, it is possible to prevent water from entering the vehicle interior through the door hole.

Furthermore, as described above, the seal body has the depression formed in the portion extending toward the door hole, and the seal portion made of the sponge rubber is provided in the depression of the seal body. The seal portion is configured to be brought into press-contact with the peripheral portion of the groove of the cover member on the side nearer to the door hole while being brought into press-contact with the peripheral portion of the door hole of the door inner panel. Thus, even when a portion of the seal portion is located at an edge portion of the groove of the cover member in a section in which the curvature radius of the groove is small, detachment of the portion of the seal portion from the cover member does not occur. This increases the water cutoff property of the seal portion, resulting in an improvement in sealing performance of the sealing cover.

Furthermore, to achieve the abovementioned object, a sealing member in accordance with an aspect of the present invention is a sealing member to be placed between a cover member and a mounting base to which the cover member is attached, in such a manner as to surround an opening of the mounting base, the sealing member including: a seal body configured to be inserted into a recess formed in the cover member in such a manner as to surround the opening of the mounting base, the seal body having a depression formed in a portion extending toward the opening; and a seal portion provided in the depression of the seal body, the seal portion being made of a sponge rubber, the seal portion being configured to be brought into press-contact with a peripheral portion of the recess of the cover member on a side nearer to the opening while being brought into press-contact with a peripheral portion of the opening of the mounting base.

According to the above configuration, the seal portion is brought into press-contact with the peripheral portion of the recess of the cover member on the side nearer to the opening while being brought into press-contact with the peripheral portion of the opening of the mounting base. Thus, the seal portion seals against the entry of fluid on a mounting base side and on a cover member side. This makes it possible to prevent entry of fluid through the opening of the mounting base and to prevent entry of fluid into the opening of the mounting base.

Furthermore, as described above, the seal body has the depression formed in the portion extending toward the opening, and the seal portion made of the sponge rubber is provided in the depression of the seal body. The seal portion is configured to be brought into press-contact with the peripheral portion of the recess of the cover member on the side nearer to the opening while being brought into press-contact with the peripheral portion of the opening of the mounting base. Thus, even when a portion of the seal portion is located at an edge portion of the recess of the cover member in a section in which the curvature radius of the recess is small, detachment of the portion of the seal portion from the cover member does not occur. This increases the sealing property of the seal portion, resulting in an improvement in sealing performance of the sealing member.

[Supplementary Note]

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

10 Sealing cover
12 Door
14 Door inner panel (mounting base)
16 Door hole (opening)
18 Cover member
22 Connecting portion
24 Intermediate wall
26 Sealing member
28 Seal body
28c Center line
30 First holding lip portion
32 Second holding lip portion
34 First sealing lip portion (first lip portion)
36 Second sealing lip portion (second lip portion)
38 Third sealing lip portion (third lip portion)
40 Edge seal portion (seal portion)
42 Drain hole
44 Sealing cover
46 Sealing member
48 Seal body
50 First holding lip portion
52 Second holding lip portion
54 Sealing lip portion (lip portion)
56 Depression
58 Edge seal portion (seal portion)

The invention claimed is:

1. A sealing cover to be attached to a door inner panel of an automobile, comprising:
a cover member having a groove that is recessed toward a vehicle interior and is formed in such a manner as to surround a door hole of the door inner panel, the cover member being configured to cover the door hole from a vehicle interior side; and
a sealing member configured to be placed between the door inner panel and the cover member in such a manner as to surround the door hole,
the sealing member comprising:
a seal body inserted into the groove of the cover member, the seal body having, in a vehicle-exterior-side end portion, a first lip portion formed in such a manner as to protrude toward the door hole, the first lip portion being configured to be brought into press-contact with a peripheral portion of the groove of the cover member on a side nearer to the door hole; and
a seal portion provided in the vehicle-exterior-side end portion of the seal body, the seal portion being configured to press the first lip portion against the cover member while being brought into press-contact with a peripheral portion of the door hole of the door inner panel, wherein the seal portion is configured to press the first lip portion against the cover member in a state in which the seal portion covers the first lip portion and where the seal portion is in contact with the cover member, while being brought into press-contact with the peripheral portion of the door hole of the door inner panel.

2. The sealing cover according to claim 1, wherein the seal body has, in the vehicle-exterior-side end portion: a second lip portion formed in such a manner as to protrude away from the door hole, the second lip portion being configured to be brought into press-contact with a peripheral portion of the groove of the cover member on a side farther from the door hole; and a third lip portion formed in a base end portion of the second lip portion in such a manner as to protrude away from the door hole, the third lip portion being configured to be brought into press-contact with a peripheral portion of the door hole of the door inner panel.

3. A sealing member to be placed between a cover member and a mounting base to which the cover member is attached, in such a manner as to surround an opening of the mounting base, the sealing member comprising:
a seal body configured to be inserted into a recess formed in the cover member in such a manner as to surround the opening of the mounting base, the seal body having, in one side end portion, a first lip portion formed in such a manner as to protrude to a seal-inner side, the first lip portion being configured to be brought into press-contact with a peripheral portion of the recess of the cover member on a side nearer to the opening; and
a seal portion provided in the one side end portion of the seal body, the seal portion being configured to press the first lip portion against the cover member while being brought into press-contact with a peripheral portion of the opening of the mounting base,
wherein the seal portion is configured to press the first lip portion against the cover member in a state in which the seal portion covers the first lip portion and where the seal portion is in contact with the cover member, while being brought into press-contact with the peripheral portion of the opening of the mounting base.

4. The sealing member according to claim 3, wherein the seal body has, in the one side end portion: a second lip portion formed in such a manner as to protrude to a seal-outer side, the second lip portion being configured to be brought into press-contact with a peripheral portion of the recess of the cover member on a side farther from the opening; and a third lip portion formed in a base end portion of the second lip portion in such a manner as to protrude to the seal-outer side, the third lip portion being configured to be brought into press-contact with a peripheral portion of the opening of the mounting base.

* * * * *